(12) United States Patent
Suzuki et al.

(10) Patent No.: US 7,213,922 B2
(45) Date of Patent: May 8, 2007

(54) PROJECTOR

(75) Inventors: Masayuki Suzuki, Miyogawa (JP); Mamoru Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 11/043,465

(22) Filed: Jan. 27, 2005

(65) Prior Publication Data

US 2005/0168699 A1  Aug. 4, 2005

(30) Foreign Application Priority Data

Jan. 30, 2004 (JP) ............................. 2004-023917

(51) Int. Cl.
| | |
|---|---|
| G03B 21/26 | (2006.01) |
| G03B 21/28 | (2006.01) |
| G02F 1/1335 | (2006.01) |
| G02F 1/00 | (2006.01) |
| H04N 5/74 | (2006.01) |
| H04N 9/69 | (2006.01) |
| H04N 5/52 | (2006.01) |
| H04N 5/57 | (2006.01) |
| H04N 5/58 | (2006.01) |
| G02B 27/12 | (2006.01) |
| G09G 3/30 | (2006.01) |

(52) U.S. Cl. ............................. 353/31; 353/34; 353/37; 353/82; 349/8; 348/603; 348/678; 348/687; 348/751; 348/757; 348/758; 359/242; 359/639; 345/77; 345/589; 345/617; 345/690

(58) Field of Classification Search .................. 353/31, 353/20, 30, 33, 34, 37, 81, 82, 84, 98, 99; 349/5, 7–9; 348/739, 744, 750, 751, 757, 348/758, 759, 761, 771; 359/618, 634, 636, 359/638–640; 345/32, 48, 50, 55, 84, 87, 345/88

See application file for complete search history.

(56) References Cited

U.S. PATENT DOCUMENTS

| | | | |
|---|---|---|---|
| 6,327,093 B1 * | 12/2001 | Nakanishi et al. | .......... 359/634 |
| 6,943,756 B1 * | 9/2005 | Choi | ............................ 345/32 |

FOREIGN PATENT DOCUMENTS

| | | |
|---|---|---|
| JP | 2001-100699 | 4/2001 |
| JP | 2002-365720 | 12/2002 |

* cited by examiner

*Primary Examiner*—W. B. Perkey
*Assistant Examiner*—Rochelle Blackman
(74) *Attorney, Agent, or Firm*—Oliff & Berridge PLC

(57) ABSTRACT

Aspects of the invention provide a projector capable of comparatively easily achieving a contrast ratio higher than the original contrast ratio of the liquid-crystal light valve by a simple mechanism. The illumination light modulated by liquid-crystal light valves, i.e., image light, can be combined together in a cross dichroic prism, and then light intensity of suitable pixels is reduced by a proper amount by a liquid-crystal light valve, and then sent to a projection lens. The image light entering the projection lens can be projected to a projection surface. Because the light intensity of the image light formed by the liquid-crystal light valves is appropriately attenuated at suitable pixel areas by the liquid-crystal light valve, image light projection with a contrast ratio exceeding by far the contrast ratio achievable by the liquid-crystal light valves alone is possible due to cumulative light-intensity adjustment.

6 Claims, 2 Drawing Sheets

PROJECTOR

BACKGROUND OF THE INVENTION

1. Technical Field of Invention

Aspects of the invention relate to a projector for projecting an image by use of a liquid-crystal light valve and other light modulating devices.

2. Description of Related Art

Some related art projectors form a color image by combining, through a special prism, images of respective colors separately formed by sending three colors, RGB, of illumination light to three liquid-crystal light valves, for example. See, for example, JP-A-2002-365720. The contrast ratio achievable on such related art projector, at present, has the upper limit of approximately 1000:1.

Meanwhile, on the CRT or a film, a contrast ratio of 3000:1 or higher is obtained, depending on the viewing environment. Incidentally, according to movie directors and movie critics, where contrast ratio is concerned the ultimate target images desired for movies, require a 5000:1 ratio. Taking account of film overshoot (peaks), nearly 6000:1 is considered required in the future.

In the related art projector as above, the black portion brightness can be reduced by regulating the voltage applied to the lamp which is the light source. However, usually, the amount of light can be reduced only to 80% of maximum because of lamp characteristics.

Meanwhile, there is a proposal that an illumination light amount adjusting device be arranged between the light source and the liquid-crystal light valve, as another method to improve the dynamic range of projection images. See, for example, JP-A-2001-100699. Here, the illumination light amount adjusting device can have a polarization plate for achieving a desired illumination light amount by rotation to a certain direction and a ultrasonic motor for regulating the rotation.

SUMMARY OF INVENTION

However, with a related art projector in which the illumination light amount adjusting device is arranged between the light source and the liquid-crystal light valve, the illumination light amount adjusting device tends to be large sized because of the mechanical mechanism etc. used, and operation is not easy to control. Particularly, illumination light amount cannot be adjusted at high speed because of response time limitation of the mechanical mechanism, and the like. Furthermore, because illumination light amount cannot be adjusted minutely on a pixel unit basis, it is impossible to increase the contrast ratio, the light-intensity difference within one projection surface.

Therefore, an aspect of the invention can provide a projector capable of easily achieving a contrast ratio higher than the contrast ratio resulting from the nature of the liquid-crystal light valve alone, by use of a simple mechanism.

An exemplary projector according to the invention can include an illuminating device having a light source, forming illumination light by utilization of the light source, a main light modulating device to be illuminated by the illumination light from the illuminating device and for modulating the illumination light to form image light, an auxiliary light modulating device for attenuating, by modulation, light intensity of the image light formed by the main light modulating device, a projection optical system for projecting the image light formed by the main light modulating device and auxiliary light modulating device to a projection surface, and a signal processing circuit for generating, from an inputted image signal, a drive signal to the main light modulating device and auxiliary light modulating device which increases the contrast ratio of the image light projected, by harmonizing operation of the main light modulating device and the auxiliary light modulating device. Although contrast ratio, in principle means the maximum light-intensity ratio among the pixels in a display face that can be expressed, here it means the maximum light-intensity ratio between the pixels within one projection surface or the maximum light-intensity ratio between a plurality of continuing projection surfaces.

In the above projector, because the auxiliary light modulating device attenuates the light intensity of image light formed by the main light modulating device by modulation, light intensity can be adjusted cumulatively by the main and auxiliary light modulating devices. In this case, the main and auxiliary light modulating devices are operated harmoniously by the signal processing circuit, making it possible to project image light at a contrast ratio exceeding by far the contrast ratio that can be realized by the main light modulating device singly.

In an example of the invention, in the projector, the illuminating device generates different three colors of illumination light, the main light modulating device having three color-light modulating devices illuminated respectively by the three colors of illumination light and separately modulating the respective colors of illumination light, and a light-combining member for combining together image light of the respective colors from the three color-light modulating devices. In this case, the three colors of illumination light can be modulated separately and combined together, thus making possible to project a color image high in brightness.

In an example form of the invention, in the projector, the auxiliary light modulating device can be arranged between the light combining member and the projection optical system. In this case, the auxiliary light modulating device for attenuation is not provided for the color-light modulating device for each color but the light intensity of image light that has passed through the main light modulating device is attenuated by a single auxiliary light modulating device, such as a single liquid-crystal light valve, thus making the auxiliary light modulating device or the projector cheap in price.

In another example of the invention, the three color-light modulating devices and the auxiliary light modulating device are all liquid-crystal light valves having the same structure. In this case, the auxiliary light modulating device can be made with a simple structure matched to the color-light modulating device.

In another example of the invention, the signal processing circuit determines drive signals to be sent to the main and auxiliary light modulating devices by making a predetermined operation on the inputted signals of respective colors. In this case, a desired contrast can be achieved by this processing of the image signals of respective colors.

In another example of the invention, the signal processing circuit can determine the drive signal to be sent to the auxiliary light modulating device by referring to the maximum value of the signals of respective colors in the inputted image signal. In this case, the main light modulating device can express the intensity level of each color accurately while the auxiliary light modulating device can achieve a desired light reduction, making possible to project an image high in contrast and image quality.

In another example of the invention, the signal processing circuit can use signals of respective colors in the inputted image signal as they are as the drive signals to the main light modulating device, and the drive signal to the auxiliary light modulating device is determined by making a predetermined operation on the signals of respective colors in the inputted image signal. In this case, a desired contrast can be achieved by processing the image signals of respective colors. Besides, operation processing is satisfactorily performed on the auxiliary light modulating device only. Thus, the burden of image processing is lessened.

In another example of the invention, the auxiliary light modulating device can modulate the light intensity of image light one unit at a time, the unit being at least one pixel in the main light modulating device. In this case, the intensity modulation by the auxiliary light modulating device can be made on the basis of pixel units in the main light modulating device. Otherwise, the intensity modulation by the auxiliary light modulating device can be made collectively on the unit basis of a plurality of pixels of the main light modulating device.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

Figure 1:
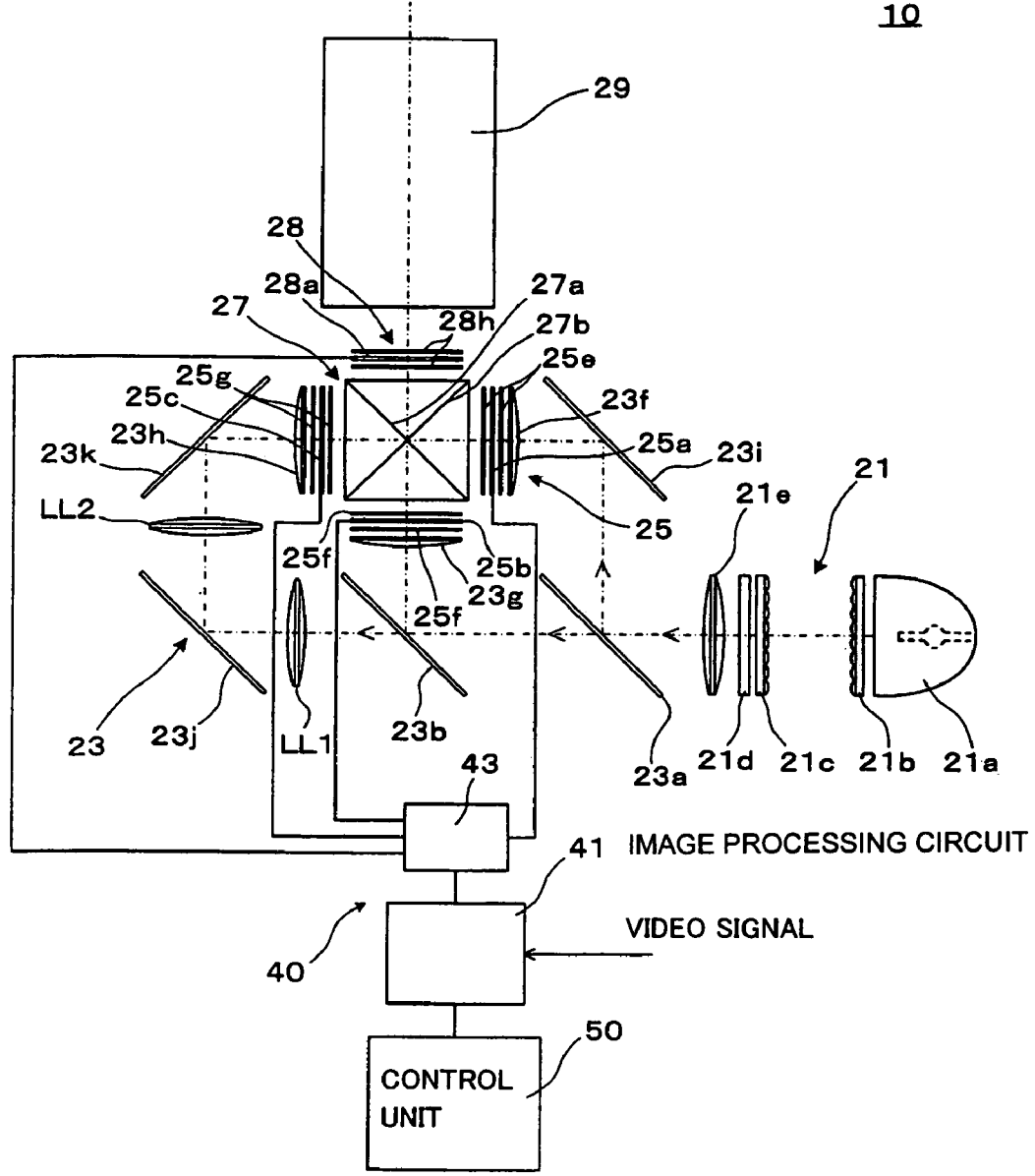
FIG. 1 shows an exemplary block diagram explaining a projector according to one embodiment of the invention.

FIG. 1 is an exemplary view explaining the construction of a projector according to an embodiment of the invention. The projector 10 can include a light source 21 for generating source light, a light-splitting system 23 for splitting the source light from the light source 21 into three colors of RGB, a main light modulator 25 illuminated by the respective colors of light exiting from the light-splitting system 23, a light-combining optical system 27 for combining the respective colors of image light from the main light modulator 25, an auxiliary light modulator 28 which is arranged on the light-exit side of the light-combining optical system 27 and which carries out two-dimensional light intensity modulation on the image light, and a projection lens 29 for projecting the image light passed the auxiliary light modulator 28 to a projection surface. Furthermore, the projector 10 can include a signal-processing circuit 40 for operating the light modulators for respective colors, etc. built in the main light modulator 25 on the basis of image signals inputted from outside, and a control unit 50 for suitably operating the light source 21, the light modulators 25, 28, the signal-processing circuit 40, etc. to thereby totally control the overall operations of the projector 1.

The light source 21 has a light-source lamp 21a, a pair of fly-eye optical systems 21b, 21c, a polarization conversion member 21d and a superimposing lens 21e. Here, the light-source lamp 21a can include a high-pressure mercury lamp, for example, and has a concave mirror for collimating the source light. Meanwhile, the pair of fly-eye optical systems 21b, 21c comprises a plurality of element lenses in a matrix arrangement. By these element lenses, the source light from the light-source lamp 21a is split and separately focused/dispersed. The polarization conversion member 21d converts the source light exiting from the fly-eye optical system 21c into a particular polarization component and supplies it to the next-stage optical system. The superposed lens 21e suitably focuses the entire illumination light that has passed the polarization conversion member 21d and enables superimposed illumination onto the spatial light modulators provided for the respective colors. Namely, the illumination light that has passed both the fly-eye optical systems 21b, 21c and the superposed lens 21e focused so as to be superimposed on the liquid-crystal light valves 25a–25c for respective colors provided in the main light modulator 25 through the light splitting system, detailed below.

The light splitting system 23 has first and second dichroic mirrors 23a, 23b, three field lenses 23f, 23g, 23h and reflection mirrors 23i, 23j, 23k, and constitute a illuminating device together with the light source 21. The first dichroic mirror 23a reflects R-light of the three colors RGB and allows G-light and B-light to pass through. Meanwhile, the second dichroic mirror 23b reflects G-light of the two remaining colors GB and allows B-light to pass through. In this light splitting system 23, R-light reflected by the first dichroic mirror 23a is reflected by the reflection mirror and enters the field lens 23f for incident angle adjustment. Meanwhile, G-light that passed the first dichroic mirror 23a and was reflected by the dichroic mirror 23b enters the field lens 23g. Furthermore, B-light that passed through the second dichroic mirror 23b passes through relay lenses LL1, LL2 for optical-path difference compensation, is reflected by reflection mirrors 23j, 23k, and enters the field lens 23h for incident angle adjustment.

The main light modulator 25 can include the following devices: three liquid-crystal light valves 25a–25c which are color-light modulating devices, and three sets of polarization filters 25e–25g arranged to sandwich the respective light valves 25a–25c. R-light, reflected by the first dichroic mirror 23a, passes through the field lens 23f to the liquid-crystal light valve 25a, illuminating it uniformly. G-light, that passes through the first dichroic mirror 23a and was reflected by the second dichroic mirror 23b, passes through the field lens 23g to the liquid-crystal light valve 25b, illuminating it uniformly. B-light, that passes through both the first and second dichroic mirrors 23a, 23b, passes through the field lens 23h to the liquid-crystal light valve 25c, illuminating it uniformly. The liquid-crystal light valves 25a–25c are non light-emission type display devices for modulating the spatial or two-dimensional light intensity distribution of incident illumination light. The three colors of light respectively incident on the liquid-crystal light valves 25a–25c are modulated according to a drive signal inputted as an electric signal to the liquid-crystal light valves 25a–25c. On this occasion, the polarization filter 25e–25g regulates the polarization direction of the illumination light entering the liquid crystal light valve 25a–25c and extracts modulated light of a predetermined polarization direction out of the modulated light exiting the liquid-crystal light valve 25a–25c.

The cross dichroic prism 27 is a light-combining member incorporating a dielectric multi-layer film 27a for R-light reflection and a dielectric multi-layer film 27b for B-light reflection orthogonal to each other. The dielectric multi-layer film 27a in the cross dichroic prism 27 reflects R-light from the liquid-crystal light valve 25a so that the light turns toward the right and exits, allows G-light from the liquid-crystal light valve 25b to travel straight through the dielectric multi-layer films 27a and 27b and exit, and the dielectric multi-layer film 27b reflects B-light from the liquid-crystal light valve 25c so that it turns toward the left and exits.

The auxiliary light modulator 28 has, as an auxiliary light modulating device, a liquid-crystal light valve 28a for light modulation and a pair of polarization filters 28h arranged in a manner sandwiching the liquid-crystal light valve 28a. The liquid-crystal light valve 28a has a similar structure to the liquid-crystal light valve 25a–25c provided in the main light modulator 25. The pair of polarization filters 28h has a similar structure to the pairs of polarization filters 25e–25g sandwiching the liquid-crystal light valve 25a–25c. By the auxiliary light modulator 28, the image light of combined light combined by the cross dichroic prism 27 can be attenuated on a pixel unit basis, particularly in the lower intensities, making it possible to supplementally increase the contrast in the projection image. For this reason, a special drive signal which is generated based upon drive signals, etc. inputted to the liquid-crystal light valves 25a–25c for respective colors is inputted in the liquid-crystal light valve 28a.

Figure 2:
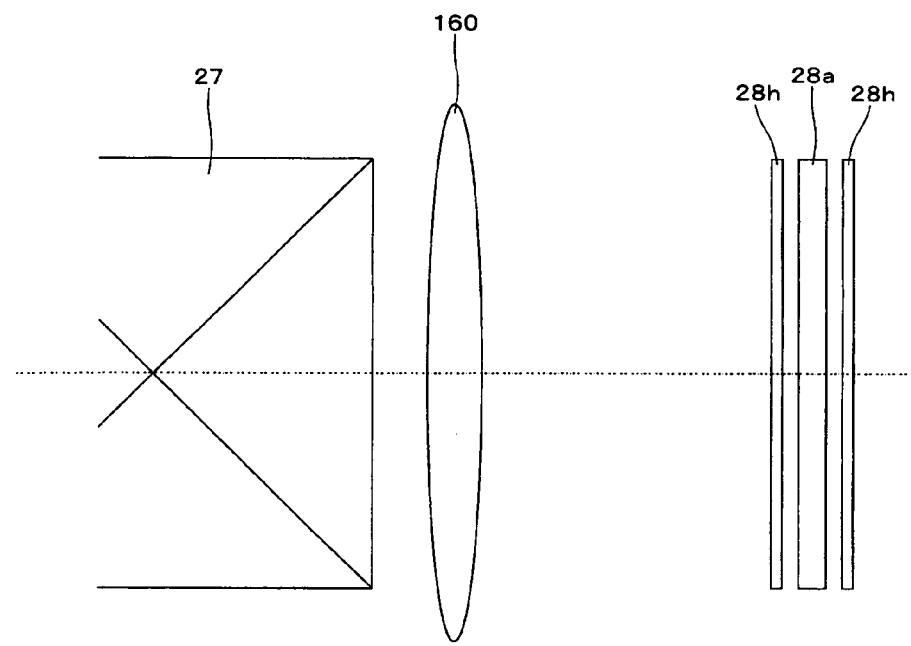
FIG. 2 shows an exemplary diagram explaining a modification of a projector shown in FIG. 1.

The projection lens 29 of the projection optical system projects the images from the liquid-crystal light valves 25a–25c for respective colors to the projection surface together with the image from the liquid-crystal light valve 28a a contrast-adjusting two-dimensional filter. Consequently, the focal point to the rear of the projection lens 29 is deepened in focal depth. Incidentally, as shown in FIG. 2, it is possible to arrange a refocus lens 160 between the light-combining cross dichroic prism 27 and the contrast-adjusting light valve 28a, for focusing the images from liquid-crystal light valves 25a–25c at the liquid-crystal light valve 28a. In the above, by somewhat defocusing the image on the liquid-crystal light valve 28a side, there arises an advantage that the black matrix on the liquid-crystal light valve 28a side becomes less visible.

The signal processing circuit 40 has an image processing circuit 41 for carrying out a suitable signal processing on an image signal inputted from the outside and obtaining an image data signal in a digital format for example, and a liquid-crystal drive circuit 43 for generating a drive signal for operating the liquid-crystal light valves 25a–25c, etc. provided in the main light modulator 25 on the basis of the image data signal outputted from the image processing circuit 41. To the image processing circuit 41, the image signal inputted is a video image signal, etc. from a video reproducing apparatus connected externally. In the image processing circuit 41, on the basis of an input signal such as a video image signal, generated is an image data signal serving as a basis to operate the liquid-crystal light valves 25a–25c in the main light modulator 25, and also generated is an auxiliary signal for operating the liquid-crystal light valve 28a in the auxiliary light modulator 28. The liquid-crystal drive circuit 43 generates a drive signal for operating the liquid-crystal light valves 25a–25c, 28a on the basis of an image data signal, etc. generated by the image processing circuit 41, and outputs it to these liquid-crystal light valves 25a–25c, 28a.

The control unit 50 outputs a control signal to the signal processing circuit 40 and controls indirectly the operation state of the liquid-crystal light valves 25a–25c, 28a. The signal processing circuit 40 generates the above image data signal and auxiliary signal, on the basis of an image signal inputted from the outside and an instruction signal from the control unit 50. Specifically, prepared are a main image data signal for color display directed for the liquid-crystal light valves 25a–25c for respective colors, and an auxiliary image data signal for contrast increase directed for the liquid-crystal light valve 28a.

In the below, explanation is made on a calculation processing method of an image data signal, etc. in the control unit 50 and signal processing circuit 40.

In the first method, in the signal processing circuit 40 are prepared main image data signals for driving the liquid-crystal light valves 25a–25c for respective colors, which are corrected so as to enhance the light intensity to the upper limit. Furthermore, in the signal processing circuit 40, prepared is an auxiliary image data signal for driving the liquid-crystal light valve 28a for compensating for the correction in the main image data signal and returning the entire light intensity to the former light intensity.

Here, a particular pixel of an image frame will be considered in order to make a concrete explanation. The digitized versions of the inputted RGB image signals are named SR, SG and SB, and the maximum value among them is named PMAX. Here, in the case that the maximum value PMAX is that of the image data signal SR, SR=PMAX. Correction is made after setting the most intense R-light image data signal to be the upper limit value. Namely, of the main image data signals, the R-light signal corresponding to R-light is made SR', and the R-light signal SR' is changed to the upper limit value.

$$SR'=100(\%) \tag{1}$$

By adjusting the auxiliary image signal correspondingly to this, transmissivity is reduced at the corresponding pixel of the liquid-crystal light valve 28a. Namely, taking the light-reducing signal corresponding to the auxiliary image data signal as SY, the following is set.

$$SY=SR \tag{2}$$

Namely, the light-reducing signal SY corresponds to the initial image signal of R-light. Meanwhile, the G-light signal of the main image data signals corresponding to G-light is made SG', and the following is set in order to compensate for transmissivity decrease at the corresponding pixel of the liquid-crystal light valve 28a and keep color balance.

$$SG'=SG/SR \tag{3}$$

Likewise, the B-light signal of the main image data signals corresponding to B-light is made SB', and the following is set.

$$SB'=SB/SR \tag{4}$$

An example of the data conversion as above with concrete numerals is summarized in Table 1 below.

TABLE 1

| | Actual input | | | Light intensity before light reduction | Input to panel | | | | Output (total) | | | Light intensity after light reduction |
|---|---|---|---|---|---|---|---|---|---|---|---|---|
| | SR | SG | SB | LR0 | SR' | SG' | SB' | SY | R | G | B | LR1 |
| White | 100 | 100 | 100 | 100.00 | 100 | 100 | 100 | 100 | 100 | 100 | 100 | 100.00 |
| | 100 | 50 | 50 | 100.00 | 100 | 50 | 50 | 100 | 100 | 50 | 50 | 100.00 |
| | 100 | 20 | 10 | 100.00 | 100 | 20 | 10 | 100 | 100 | 20 | 10 | 100.00 |

TABLE 1-continued

| | Actual input | | | Light intensity before light reduction | Input to panel | | | | Output (total) | | | Light intensity after light reduction |
|---|---|---|---|---|---|---|---|---|---|---|---|---|
| | SR | SG | SB | LR0 | SR' | SG' | SB' | SY | R | G | B | LR1 |
| | 100 | 0 | 0 | 100.00 | 100 | 0 | 0 | 100 | 100 | 0 | 0 | 100.00 |
| | 50 | 30 | 20 | 50.08 | 100 | 60 | 40 | 50 | 50 | 30 | 20 | 50.08 |
| | 40 | 10 | 20 | 40.10 | 100 | 25 | 50 | 40 | 40 | 10 | 20 | 40.10 |
| | 20 | 0 | 5 | 20.13 | 100 | 0 | 25 | 20 | 20 | 0 | 5 | 20.13 |
| Black | 0 | 0 | 0 | 0.17 | 0 | 0 | 0 | 0 | 0 | 0 | 0 | 0.00 |

In the above Table 1, the R-light intensities LR0, LR1 before and after light reduction are expressed in a standardized arbitrary unit. As apparent from the Table, the signals in respective colors SR', SG', SB' maintain their relative light intensity ratios, and a total light-intensity increase caused by the respective color signals SR', SG', SB' is offset by a light reducing signal SY. Namely, the image light passing the liquid-crystal light valves 25a–25c and liquid-crystal light valve 28a as a whole has the former light intensity and tone, but also is an integration of the maximum light-reduction degree executed by the liquid-crystal light valves 25a–25c and the maximum light-reduction degree executed by the liquid-crystal light valve 28a, at the darkest black signal level. Explaining it with a concrete example, in the case that the maximum contrast ratios (light-reduction degrees) according to the specifications when operating the liquid-crystal light valves 25a–25c and 28a are all 600:1, the maximum contrast ratio obtainable is 360000:1. However, the characteristic of the liquid-crystal light valve 28a may be set to obtain a contrast ratio of approximately 10:1 instead of the maximum value according to the specifications, to thereby make the maximum obtainable contrast ratio approximately 6000:1. In this case, the drive voltage range of the liquid-crystal light valve 28a is adjusted, or the characteristic or angular direction is adjusted of the polarization filter 28h arranged on the light exit side of the liquid-crystal light valve 28a.

In the second method, the signal processing circuit 40 utilizes the input image signal as it is as a main image data signal for driving the liquid-crystal light valves 25a–25c for respective colors, but it also prepares a signal in which the light intensity of the main image data signals of low-light intensity pixels is further reduced commensurate with their original intensity, as an auxiliary image data signal for driving the liquid-crystal light valve 28a.

For explanation purposes, all the pixels in an image frame of a certain frame will be considered. Here, the upper limit value (corresponding to transmissivity 100%) of the light intensity signals SY0 at the pixels is named TMAX, and if there exists a pixel corresponding to the upper limit value TMAX, then light reduction is not performed on this image data signal. Instead, the maximum value TMAX is made a standard in a filtering process for light intensity reduction that is performed on the other pixels through the liquid-crystal light valve 28a, or else, a filtering process for light intensity reduction can be made through the liquid-crystal light valve 28a, with the maximum value of the light intensity signals SY0 being made a standard. Namely, by applying such a filtering as to further increasing the darkness of a dark pixel, the light intensity lower limit is extended and the contrast ratio is increased. Incidentally, the light intensity signal SY0 can use a value determined by operation from the light tone values SR, SG, SB of R, G and B color signals (specifically, the general relationship between a color signal and a light-intensity signal $SY0=0.3SR+0.6SG+0.1SB$).

Here, an exemplary operation processing method is explained in the case of using the upper limit value mentioned above. It is assumed that the maximum light intensity adjustment range of each of the first-stage liquid-crystal light valves 25a–25c is a0, the light intensity at the lower limit value is b0, the maximum light intensity adjustment range over both the first-stage liquid-crystal light valves 25a–25c and the next-stage liquid-crystal valve 28a is a1, and the light intensity at the lower limit value is b1. Meanwhile, the light intensity data of a particular pixel is made SY0 (expressed as a percentage). Furthermore, the contrast ratio among all the liquid-crystal light valves 25a–25c is made C0, and the contrast ratio of the liquid-crystal light valve 28a is C1. In this case, the following relationship is fulfilled:

$$a0+b0=a1+b1 \qquad (5)$$

$$C0=(a0+b0)/b0 \qquad (6)$$

$$C1=b0/b1 \qquad (7).$$

Figure 3:
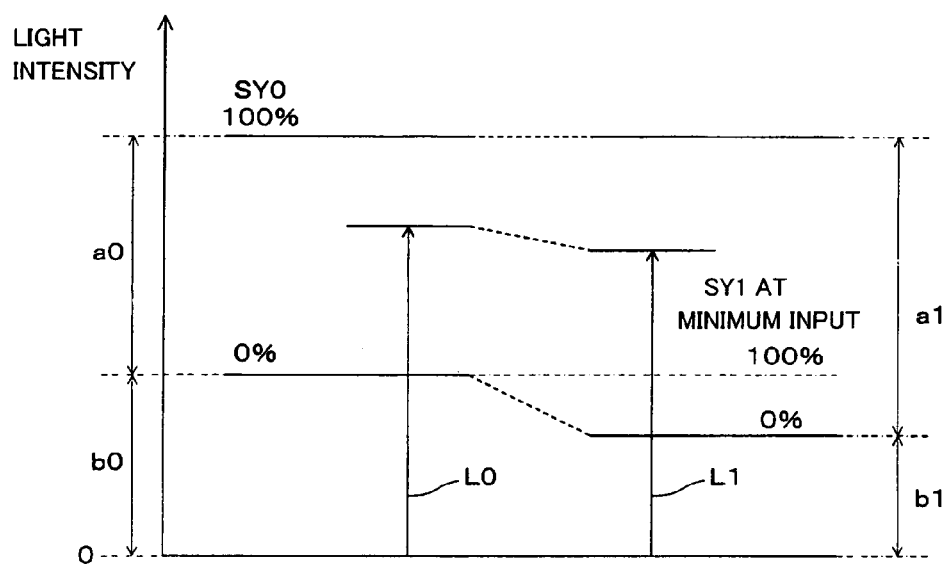
FIG. 3 shows a graph explaining contrast ratio increase by the projector shown in FIG. 1.

For reference, in the graph of FIG. 3 are visually shown the significances of the references a0, b0, a1, b1 used in the above expressions. In the graph, the axis of ordinate represents light intensity of illumination light or image light incident on the liquid-crystal light valve 25a–25c or the like. From the above equations (5)–(7), the extension ratio of light intensity range RE=a1/a0 is given as:

$$RE=(C0-1/C1)\div(C0-1) \qquad (8).$$

Here, the light intensity after passage of the first-stage liquid-crystal light valves 25a–25c (light intensity before light reduction) L0 depends upon the light intensity data provided to the liquid-crystal light valve 25a–25c, as in the formula:

$$L0=(a0/100)SY0+b0=(a0/100)SY0+a1-a0+b1 \qquad (9).$$

At the liquid-crystal light valve 28a, light-reduction process is made on this L0 to thereby obtain the final light intensity L1 (light intensity after light reduction) by which the relationship between tones is kept within the light intensity adjustment range a1. This L1 is changed to:

$$L1=(a1/100)SY0+b1 \qquad (10).$$

Finding the conversion ratio F=L1/L0 of the liquid-crystal light valve 28a (note that computation is made expediently removing the lowest baseline light intensity b1 which is left even if light is made to pass completely through the liquid-crystal light valve 28a, on the assumption that, in the liquid-crystal light valve 28a, transmissivity changes linearly in accordance with the input signal), the following results:

$$F = RE \times SY0 \div \{SY0 + 100 \times (RE-1)\} \quad (11)$$

By converting this into percentage, the transmissivity TR (percentage) through the liquid-crystal light valve 28a is calculated as:

$$TR = 100F \quad (12)$$
$$= 100RE \times SY0 \div \{SY0 + 100 \times (RE-1)\}.$$

Thus, the light intensity data SY1 of the liquid-crystal light valve 28a can be easily calculated from the light intensity data SY0 at a particular pixel, expressed as transmissivity TR (percentage). Incidentally, the light intensity of the light actually passing through the liquid-crystal light valve 28a is calculated by multiplying transmissivity TR with and adding light intensity b1 to the light intensity of illumination of the liquid-crystal light valve 28a.

The data conversion as above was exemplified with concrete numerals, which is summarized in the below Table 2.

valve 28a can be adjusted so as to obtain a contrast ratio of 10:1. Alternatively, a similar effect is obtainable by such measures as adjusting the characteristic or angular direction of the polarization filter 28h arranged on the light-exit side of the liquid-crystal light valve 28a.

The image data signal calculation processing method in the signal processing circuit 40, etc. is not limited to the above. For example, the light-intensity data signals SR', SG', SB' and light-intensity data signals SR, SG, SB serving as signals for operating the liquid-crystal light valves 25a–25c for respective colors may be subjected to a suitable nonlinear correction for enhancing the difference of lightness/darkness, etc. Likewise, the light-intensity data signals SY0, SY1 for operating the liquid-crystal light valve 28a may be subjected to a suitable nonlinear correction for enhancing the difference of lightness/darkness, etc.

Further, in the above calculation process, the light-intensity data signal SY1 or the like does not need to be calculated in real time. By preparing ahead of time a conversion table for assigning a suitable light-intensity levels to intensity levels in a set range, the light-intensity data signal SY1 can be determined by looking up the value read from the present light intensity signal SY0 in the conversion table.

Here explanation is made of the overall operation of the projector 10 according to the exemplary embodiment. The

TABLE 2

| Actual input | | | | Light intensity before light reduction | Input to panel | | | | Light intensity after light reduction |
|---|---|---|---|---|---|---|---|---|---|
| SR | SG | SB | SY0 | L0 | SR | SG | SB | ST1 | L1 |
| White | | | | | | | | | |
| — | — | — | 100 | 100.00 | — | — | — | 100.00 | 100.00 |
| — | — | — | 80 | 80.03 | — | — | — | 99.96 | 80.00 |
| — | — | — | 60 | 60.07 | — | — | — | 99.89 | 60.01 |
| — | — | — | 40 | 40.10 | — | — | — | 99.75 | 40.01 |
| — | — | — | 20 | 20.13 | — | — | — | 99.34 | 20.01 |
| — | — | — | 5 | 5.16 | — | — | — | 96.94 | 5.02 |
| — | — | — | 1 | 1.17 | — | — | — | 85.86 | 1.02 |
| Black | | | | | | | | | |
| — | — | — | 0 | 0.17 | — | — | — | 0.00 | 0.02 |

In the above Table 2, the light intensity L0, L1 before and after light reduction is expressed in a standardized arbitrary unit. As apparent from the table, the light intensity data SY1 for the liquid-crystal light valve 28a for light reduction can be calculated from the light intensity data of image data signals of the liquid-crystal light valves 25a–25c for respective colors. Namely, the image light passing the liquid-crystal light valves 25a–25c and liquid-crystal light valve 28a, although as whole being an image maintaining the former tone, is an image having a high contrast ratio in which the darker the pixel, the more the blackness is increased. In other words, it is possible to achieve a contrast ratio which the cumulated value of the maximum light-reduction degree due to the liquid-crystal light valves 25a–25c and the maximum light-reduction degree due to the liquid-crystal light valve 28a. Concretely, the liquid-crystal light valves 25a–25c in operation has a contrast ratio (light-reduction degree) of 600:1, the maximum value according to the specifications. In the case that the liquid-crystal light valves 25a–25c in operation has a contrast ratio (light-reduction degree) of 10:1, the maximum contrast ratio obtainable is given 6000:1.

Incidentally, in the case that the liquid-crystal light valve 28a has specification of a contrast ratio of 600:1 similarly to the others, the drive voltage range on the liquid-crystal light source light from the light source 21 is color-split by the first and second dichroic mirrors 23a, 23b provided in the light splitting system 23, and sent as illumination light respectively to the corresponding liquid-crystal light valves 25a–25c. The liquid-crystal light valves 25a–25c are modulated by the image signal so as to have a two-dimensional refraction-index distribution to in turn spatially modulate the illumination light on a pixel unit basis. In this manner, the illumination light modulated by the liquid-crystal light valves 25a–25c, i.e., image light, is combined at the dichroic prism 27, reduced in intensity by a suitable amount at appropriate pixels by the liquid-crystal light valve 28a, and then sent to the projection lens 29. The image light entering the projection light 29 is projected onto a (not-shown) projection surface. On this occasion, the light intensity of the image light formed by the liquid-crystal light valve 25a–25c at appropriate pixel areas is appropriately attenuated by the above-mentioned liquid-crystal light valve 28a. Thus, it is possible to project image light having a contrast ratio exceeding by far the contrast ratio that could be realized by the liquid-crystal light valves 25a–25c alone.

In the above, although the invention was explained along with the present embodiment, the invention is not limited to the above embodiment. For example, although, in the above embodiment, three liquid-crystal light valves 25a–25c were separately illuminated by the RGB respective colors, local light-intensity adjustment of the image can be made by the filter of the liquid-crystal light valve 28a shown in FIG. 1 even in a projector of a type where illumination is made by a white-light source to a color display panel, using a single liquid-crystal light valve and arranging RGB filters on the respective pixels, making it possible to project image light at a high contrast ratio.

Meanwhile, although, in the above explanation, brightness adjustment is made on the pixels of the liquid-crystal light valves 25a–25c by placing the pixels of the liquid-crystal light valve 25a–25c and the pixels of the liquid-crystal light valve 28a in one-to-one correspondence, brightness adjustment can be made on the basis of domain units comprising a plurality of adjacent pixels of the liquid-crystal light valves 25a–25c (e.g. four pixels). In this case, the pixels of the liquid-crystal light valve 28a can be comprised of domain units of the liquid-crystal light valve 25a–25c. Incidentally, in the case of carrying out light adjustment on a domain unit basis, it is possible to determine the light-reduction amount based on the maximum intensity pixel within the domain, or determine the light-reduction amount based on the average values of pixels within the domain.

Meanwhile, in the above explanation, although the transmissivity through the liquid-crystal light valve 28a was locally adjusted on the pixel unit basis for example, the overall light reduction can be achieved by adjusting transmissivity over the entirety of liquid-crystal light valve 28a. In this case, in one embodiment the light-reduction amount for the whole frame is determined based on the maximum intensity-leveled pixel of within the projection surface.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
    an illuminating device having a light source that forms illumination light by utilization of the light source;
    a main light modulating device that is illuminated by the illumination light from the illuminating device and that modulates the illumination light to form image light;
    an auxiliary light modulating device that alternates, by modulation, a light intensity of the image light formed by the main light modulating device;
    a projection optical system that projects the image light formed by the main light modulating device and auxiliary light modulating device to a projection surface; and
    a signal processing circuit that generates, from an inputted image signal, a drive signal to the main light modulating device and the auxiliary light modulating device so as to increase a contrast ratio of image light projected, by harmonizing operation of the main light modulating device and the auxiliary light modulating device, the signal processing circuit determining drive signals to the main light modulating device and the auxiliary light modulating device by making a predetermined operation on signals of respective colors in the inputted image signal.

2. The projector according to claim 1, the illuminating device generating three different colors of illumination light, the main light modulating device having three color-light modulating devices that are illuminated respectively by the three colors of illumination light and that separately modulate the respective colors of illumination light, and having a light-combining member that combines together the respective colors of image light from the three color-light modulating devices and that emits the combined light.

3. The projector according to claim 2, the auxiliary light modulating device being arranged between the light combining member and the projection optical system.

4. A projector according to claim 3, the three color-light modulating devices and the auxiliary light modulating device, respectively, being liquid-crystal light valves having a same structure.

5. A projector according to claim 2, the signal processing circuit determining a drive signal to the auxiliary light modulating device with reference to a maximum value of the signals of respective colors in the inputted image signal.

6. A projector according to claim 1, the auxiliary light modulating device modulating light intensity of image light one unit at a time, where a unit is at least one pixel as to the main light modulating device.

* * * * *